United States Patent [19]

King

[11] Patent Number: 4,590,040
[45] Date of Patent: May 20, 1986

[54] CARBON BLACK REACTOR

[75] Inventor: William R. King, Bartlesville, Okla.

[73] Assignee: Phillips Petroleum Company, Bartlesville, Okla.

[21] Appl. No.: 635,079

[22] Filed: Jul. 27, 1984

Related U.S. Application Data

[62] Division of Ser. No. 490,105, Apr. 29, 1983, Pat. No. 4,483,841.

[51] Int. Cl.[4] ............ C01B 31/02; C09C 1/48
[52] U.S. Cl. .................. 422/156; 422/158; 431/158; 431/173
[58] Field of Search .............. 422/150, 156, 158; 423/455–457; 431/173, 174, 176, 158, 353; 239/463, 468; 366/165, 340

[56] References Cited

U.S. PATENT DOCUMENTS

| | | | |
|---|---|---|---|
| 2,230,960 | 2/1941 | Levy | 431/173 |
| 2,852,346 | 9/1958 | Austin | 23/209.6 |
| 3,051,556 | 8/1962 | Whitsel, Jr. | 23/259.5 |
| 3,222,136 | 12/1965 | Hess et al. | 23/259.5 |
| 3,234,703 | 2/1966 | Sullivan, Jr. | 52/596 |
| 3,523,759 | 8/1970 | Kidd | 423/456 |
| 3,915,653 | 10/1975 | Cheng | 23/259.5 |
| 3,953,583 | 4/1976 | Henderson | 422/150 |
| 4,000,250 | 12/1976 | Cheng | 423/450 |
| 4,013,420 | 3/1977 | Cheng | 23/259.5 |
| 4,030,889 | 6/1977 | Gunnell | 23/259.5 |
| 4,134,966 | 1/1979 | Austin | 423/456 |
| 4,206,192 | 6/1980 | Austin | 423/455 |
| 4,241,022 | 12/1980 | Kraus et al. | 422/156 |
| 4,383,973 | 5/1983 | Cheng | 422/156 |
| 4,483,841 | 11/1984 | King | 423/456 |

Primary Examiner—David L. Lacey
Attorney, Agent, or Firm—John R. Casperson

[57] ABSTRACT

A carbon black reactor having tangential entry of combustion gases is provided with semicircular ramps to smoothly guide the flow of each tangentially introduced stream of combustion gases toward the reactor outlet enough to avoid turbulent impact with other tangentially introduced combustion gas streams.

8 Claims, 3 Drawing Figures

CARBON BLACK REACTOR

This application is a division of pending application Ser. No. 490,105, filed Apr. 29, 1983 now U.S. Pat. No. 4,483,841 issued Nov. 20, 1984.

In one aspect, the invention relates to a reactor for the production of carbon black. In another aspect, the invention relates to a process for the production of carbon black.

In the standard Philblack ® tangential entry carbon black reactor, the flame from one burner travels 180° and impacts the flame of the opposite burner. This high velocity impact causes turbulence with consequent pressure loss. At the high volumes involved, the energy loss is important. Assuming an estimated 2 pounds per square inch pressure loss on a Philblack reactor having a 12 inch throat and an 850,000 cubic feet per minute total air flow, there is about a 200 horsepower energy loss. Reducing this pressure drop would clearly be highly desirable.

For the production of certain types of carbon black, it is often desirable to extend the oil tube well into the precombustion chamber. This poses problems in protecting the tube from the intense heat. Since replacement of the oil tube or nozzle with which it has been provided is expensive and requires that a reactor be taken out of production, it would clearly be very desirable to provide a carbon black reactor and process for carbon black production in which the oil tube is protected from the intense heat.

Under other operating conditions, it can be highly desirable to inject the oil into the stream of combustion gases radially inwardly from positions situated about the periphery of the combustion gas stream. This procedure is commonly called radial injection. One of the advantages it provides is exceptionally low grit content in the carbon black produced. Since turbulence upstream of the radial oil entry does not aid the pyrolysis process and causes undesirable pressure drop, a carbon black reactor which adapts tangential flow to more longitudinal flow of combustion gases would be very desirable since it could be implemented with minimal changes to existing plant systems.

OBJECTS OF THE INVENTION

It is an object of this invention to provide process and apparatus for the production of carbon black in which the pressure drop due to excessive turbulence in the precombustion zone has been reduced.

It is another object of this invention to provide a process and an apparatus for the production of carbon black in which the axial oil tube can be shielded from the hot combustion gases.

It is a further object of this invention to provide a process and apparatus for the production of carbon black which allows for the adaptation of vortex flow type carbon black reactors for operation in a process for the production of carbon black which is characterized by more longitudinal flow of combustion gases and radial oil injection.

STATEMENT OF THE INVENTION

According to certain aspects of the present invention, there is provided a refractory brick or block which is suitable for installing in a carbon black reactor. The refractory block is generally characterized by a shape which results from cleaving a right circular cylinder into a first half and a second half along a first cleavage plane following the longitudinal axis of the right circular cylinder, the first half having a generally semicircular first end surface, a generally semicircular second end surface juxtaposed to the generally semicircular first end surface, a first generally cylindrical sidewall connecting the first end surface to the second end surface, and a planar surface following the first cleavage plane, and cleaving the first half along a second cleavage plane which is normal to the first cleavage plane and inclined at an angle with respect to the first end surface.

According to certain other aspects of the present invention, there is provided a carbon black reactor characterized in that the sidewall of the precombustion zone is generally cylindrical in shape; a plurality of tunnels each having a tunnel diameter and adapted for conveying combustion gases open into the generally cylindrical precombustion zone generally tangentially through the generally cylindrical sidewall; and a plurality of ramps are positioned in the precombustion zone to form its upstream end wall. Each of the ramps is formed from a refractory element having a circumferential side which follows the sidewall of the precombustion zone for a portion of its circumference, a first generally radially extending side defined between an upstream edge and a downstream edge of the refractory element, a second generally radially extending side defined between an upstream edge and a downstream edge of the refractory element, and a generally planar ramp face extending between the downstream edge of the first side and the downstream edge of the second side, the ramp meeting the circumferential side along a generally helically extending edge. The downstream edge of the second side is downstream of the downstream end of the first side and one ramp is positioned in the precombustion zone for each tunnel with the tunnel opening into the precombustion zone slightly downstream of the helical edge of a ramp adjacent the downstream edge of the first side.

According to certain other aspects of the present invention, there is provided a process for producing carbon black in a reactor comprising a generally cylindrical precombustion zone coaxially connected to a generally cylindrical pyrolysis zone which comprises introducing a first stream of hot combustion gases generally tangentially into the precombustion zone, introducing a second stream of hot combustion gases generally tangentially into the precombustion zone, said second stream of hot combustion gases being introduced into the precombustion zone in a co-rotational direction with respect to the first stream of hot combustion gases through an inlet into the precombustion zone which is spaced apart from the inlet through which the first stream of hot combustion gases is introduced into the precombustion zone by an angle of about 180°, deflecting the first stream of hot combustion gases toward the pyrolysis zone by a first helical ramp positioned in the precombustion zone, deflecting the second stream of hot combustion gases toward the pyrolysis zone by a second helical ramp positioned in the precombustion zone, flowing the deflected first stream of hot combustion gases and the deflected second stream of hot combustion gases into the pyrolysis zone and mixing a carbonaceous feedstock with the hot combustion gases for pyrolysis in the pyrolysis zone to form carbon black.

DETAILED DESCRIPTION OF THE INVENTION

Figure 2:
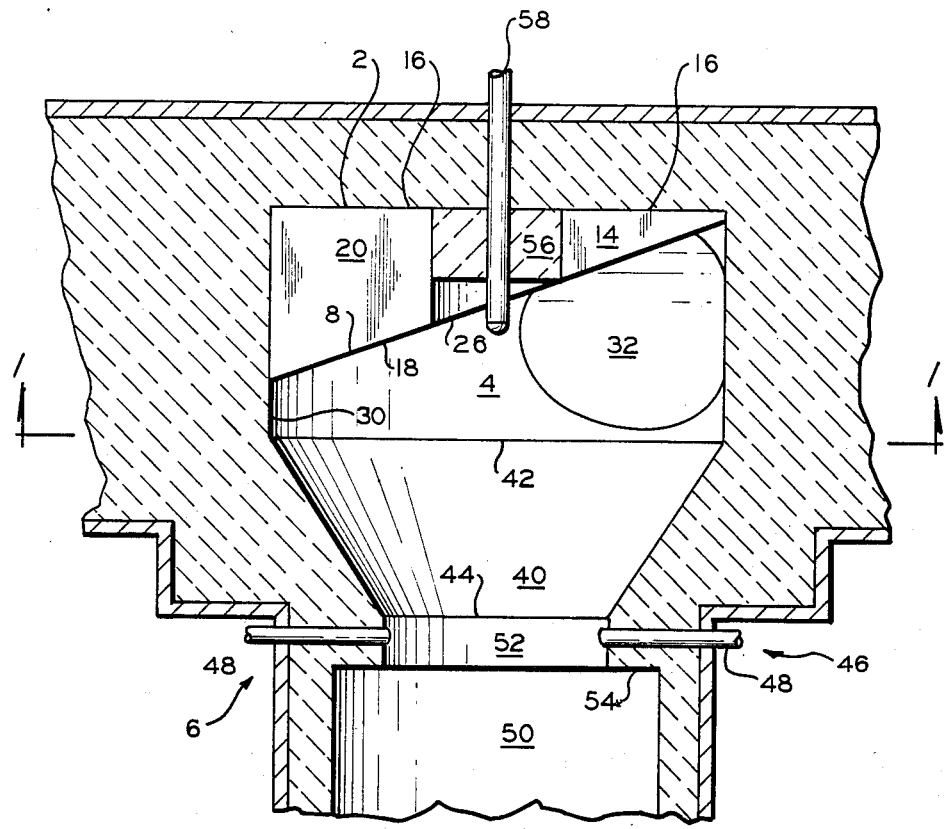
FIG. 2 is a cross-sectional view of a portion of a carbon black reactor when viewed along the lines indicated in FIG. 1.
Figure 3:
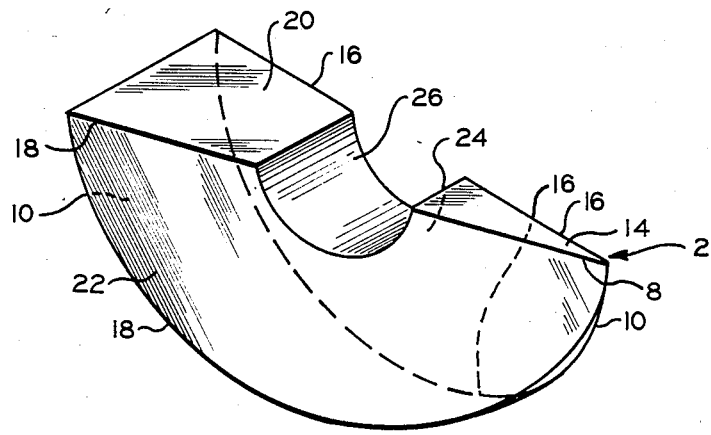
FIG. 3 is a pictorial representation of a portion of the portion of the carbon black reactor which is shown in FIGS. 1 and 2.

Referring to FIGS. 2 and 3, according to certain aspects of the present invention, there is provided a ramp 2 suitable for positioning in the precombustion zone 4 of a carbon black reactor 6 to form the upstream end wall 8 of the precombustion zone 4. Each ramp 2 is formed from a refractory material which is capable of withstanding a temperature of at least 3200° F. A suitable material from which the ramp 2 can be formed is Cerox 7001A which is available from Babcock & Wilcox of Augusta, Ga. or Chrome Alumina 887K available from Diddier-Taylor Co. of Cincinnati, Ohio.

The ramp 2 has a circumferential side 10 partially defined by the curved portion of upstream edge 16 shown as a dashed line in FIG. 3 which follows the sidewall 30 of the precombustion zone 4 for a portion of its circumference and the curved portion of downstream edge 18. The ramp 2 has a first generally radially extending side 14 which is defined between the straight portion of upstream edge 16 and the straight portion of downstream edge 18 of the refractory, and a second generally radially extending side 20 defined between the straight portion of upstream edge 16 and the straight portion of downstream edge 18 of the refractory. The sides 14 and 20 preferably are positioned in planes which extend radially outwardly from the axis of the curvature of circumferential side 10. A generally semiannular generally planar ramp surface 22 extends between the straight portion downstream edge 18 of the first radially extending side 14 and second radially extending side 20 and is further defined by the curved portion of downstream edge 18 where it meets the circumferential side 10 along a generally helically extending portion of the downstream edge 18 of the refractory.

The refractory block can be characterized as the shape which results from cleaving a half of a right circular cylinder where the half was formed by splitting the right circular cylinder longitudinally. That is to say, a right circular cylinder is cleaved into a first half and a second half along a first cleavage plane following the longitudinal axis of the right circular cylinder to produce a first half having a generally semicircular first end surface illustrated by reference numeral 24 in FIG. 3, a generally semicircular second end or ramp surface 22 juxtaposed to the generally semicircular first end surface 24 and a generally cylindrical sidewall 10 of which in part connects the first end surface 24 to the second end surface 22 and a common planar surface of which the surfaces of sides 14 and 20 are a part following the first cleavage plane, and cleaving the first half of this longitudinally split right circular cylinder along a second cleavage plane along second end surface numeral 22 which is normal to the first cleavage plane defined by surfaces of sides 14 and 20 and inclined at an angle with respect to the first end surface defined by numeral 24.

Where the reactor is to be utilized with axial injection of carbonaceous feedstock, the refractory block will generally be provided with a depression 26, preferably semi-cylindrical, dividing the surfaces of sides 14 and 20 to permit positioning of an axial feedstock tube through the upstream end wall of the reactor. Usually, the depression 26 will be juxtaposed axially inward from the generally cylindrical surface of side 10. Where the reactor is to be operated with radial inward feed-stock injection, it is preferred that the surfaces of sides 14 and 20 merge in a common plane since such a construction will reduce turbulence and thus pressure drop.

Generally speaking, the ramp surface 22 will be inclined in a plane which is at an angle to the longitudinal axis of the reactor between about 10° and 45°, preferably between about 15° and 30°. This can be expeditiously accomplished in accordance with the invention by constructing the block so that the second cleavage plane illustrated by second end surface 22 is at an angle of between about 10° and 45° with respect to the first end surface 24. Preferably, the second cleavage plane is at an angle of between about 15° and about 30° with respect to the first end surface 24.

Preferred shapes of the refractory block 2 result from cleaving the first half of the right circular cylinder along the second cleavage plane into a first quarter and a second quarter of the cylinder, such as to produce the shape which results from cleaving the first half along a second cleavage plane that passes through opposite corners of the planar surface following the first cleavage plane which is illustrated in the drawings.

The refractory block 2 is usefully employed in a carbon black reactor 6 which has the following characteristics. The precombustion zone 4 preferably is formed with a generally cylindrical sidewall 30. A plurality of tunnels open into the precombustion zone 4 for the introduction of combustion gases. Usually, a first tunnel 32 and a second tunnel 34 each having a tunnel diameter and being generally cylindrical open generally tangentially into the precombustion zone 4 through the generally cylindrical sidewall 30. One ramp 2 is positioned in the precombustion zone 4 for each tunnel 32 or 34 with the tunnel opening tangentially into the zone 4 and onto the downstream second end surface 22 of the ramp 2. Each ramp 2 is positioned in the zone 4 so that the downstream portion of edge 18 of the second generally radially extending side 20 is downstream of the downstream portion of edge 18 of the first generally radially extending side 14. Preferably, the ramps are positioned in a head-to-tail arrangement with the surface 14 of one ramp abutting the surface 20 of the next adjacent ramp etc. In this manner, each tunnel 32 or 34 opens into the precombustion zone 4 onto the surface 22 of its respective ramp slightly downstream of the helically extending portion of the downstream edge 18 of the ramp.

Figure 1:
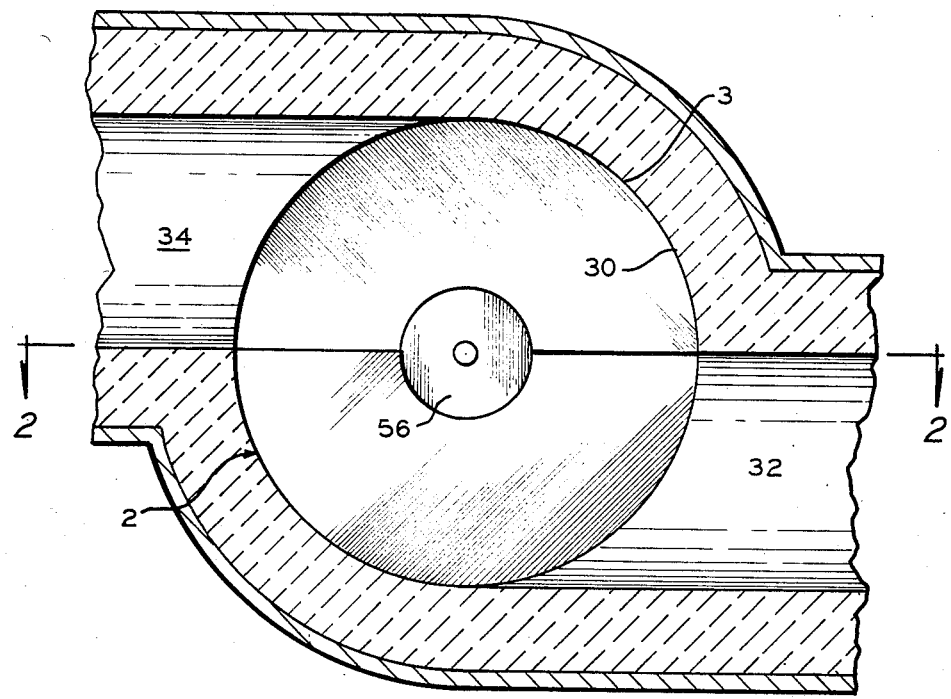
FIG. 1 is a cross-sectional view of a portion of a carbon black reactor when taken along the lines indicated in FIG. 2.

The preferred reactor is characterized by two tunnels and two ramps with the tunnels opening into the precombustion zone co-rotationally opposed from each other and each ramp is generally semicircular and is positioned to smoothly guide the flow from each tunnel toward the reactor outlet just enough to avoid direct impact with the combustion gases being introduced through the other tunnel. This is expeditiously carried out in accordance with this embodiment of the invention by positioning the downstream edge 18 of each second surface 20 just slightly downstream of the downstream edge of the tunnel which opens into the precombustion zone 4 slightly downstream of the helical edge 18 of the first surface of the other ramp 3 in FIG. 1.

With reference to FIG. 2, the carbon black reactor in accordance with certain aspects of the present invention preferably comprises a generally frustoconical acceleration zone 40 preferably coaxially connected to the downstream end of the precombustion zone 4 and converging away from the precombustion zone 4 from an inlet 42 having a diameter about the same as that of the precombustion zone 4 to an outlet 44 having a diameter in the range of from about 10 percent to about 50 percent of the diameter of the precombustion zone 4. Generally, the outlet of the acceleration zone 40 will have a diameter in the range of from about 6 inches to about 16 inches where the carbon black reactor is for the production of carbon blacks suitable for reinforcing tire treads. A means 46 is preferably associated with the outlet 44 of the precombustion zone 40 for the introduction of a carbonaceous feedstock radially inward toward the axis of the reactor. In the illustrated embodiment, the means 46 comprises a plurality of feedstock injectors 48 each connected to a source of carbonaceous feedstock suitable for pyrolyzing the form carbon black not shown. Preferably, the injectors 48 are each provided with a nozzle tip for injecting carbonaceous feedstock into the reactor at the discharge end 44 of the acceleration zone 40. Where the reactor 6 is provided with radial feedstock injection means 46, it is further desirable that the outlet 44 of the acceleration zone 40 be generally coaxially connected to a generally cylindrical reaction zone 50 having a diameter in the range of from about 1.1 to about 3 times the diameter of the outlet 44 of the frustoconical zone 40. The reaction zone 50 is preferably positioned within about a distance of 1 diameter from the feedstock injection, usually about at the outlet 44 of the generally frustoconical zone, and can be connected to the generally frustoconical zone 40 by a short generally cylindrical zone 52 which forms a reactor throat if desired. Most preferably, the generally cylindrical reaction zone 50 is connected to the generally cylindrical zone 52 by a generally annular upstream end wall 54 since this feature seems to generate turbulence at a desirable location in the reactor and increase yield from feedstock.

In accordance with certain other aspects of the invention, a generally cylindrical refractory member 56 is axially positioned in the precombustion zone 4 between the first ramp 2 and the second ramp 3. Preferably, the generally cylindrical refractory member 56 fits closely into the depressions 26 in the first and second ramps. When present, the generally cylindrical refractory member 56 will have a diameter in the range of from about 0.1 to about 0.5 times the diameter of the precombustion zone, usually a diameter in the range from about 0.1 to about 0.3 times the diameter of the precombustion zone. The generally cylindrical refractory member will usually extend in a downstream direction into the generally cylindrical precombustion zone to a depth about equal to or less than the downstream end edge of the second surface 18, to avoid excessive turbulence generation outside of the carbon forming zone. Where the reactor is to be used with axial introduction of carbonaceous feedstock, it will generally further comprise a means 58 connected to a suitable source of carbonaceous feedstock not shown extending generally axially through the generally cylindrical refractory member 56 and into the precombustion zone 4 for introducing a carbonaceous feedstock into the carbon black reactor from along the axis thereof.

The reactor can be operated by a process comprising introducing a first stream of hot combustion gases generally tangentially into the precombustion zone 4 through the tunnel 32 for example. A second stream of hot combustion gases is introduced generally tangentially into the precombustion zone 4 through the tunnel 34 for example. The second stream of hot combustion gases is preferably introduced into the precombustion zone 4 in a co-rotational direction with the first stream of hot combustion gases through an inlet which is spaced apart from the inlet through which the first stream of hot combustion gases is introduced by an angle of about 180°. The first stream of hot combustion gases introduced into the precombustion zone 4 through the tunnel 32 is deflected by a first helical ramp, for example the ramp 2 which is positioned in the precombustion zone. The second stream of hot combustion gases which is introduced into the precombustion zone 4 through the tunnel 34 is deflected toward the reaction zone 50 by a second helical ramp 3 which is positioned in the precombustion zone 4. The deflected first stream of hot combustion gases and the deflected second stream of hot combustion gases then flows into the reaction zone 50 and is mixed with a carbonaceous feedstock introduced into the reactor through the carbonaceous feedstock injection means 58 and/or 46 for pyrolysis to form carbon black.

The streams of hot combustion gases introduced into the precombustion zone 4 through the tunnels 32 and 34 will generally be at a temperature within the range of about 2200° to about 3000° F. and contain in the range of from about 5 to about 15 volume percent reactive oxygen. These gases are generally formed by combusting an oxygen containing gas, usually air, with a combustible fuel, which is usually natural gas or oil. The combustion gases flow through the converging zone 40 and through the abruptly diverging zone defined by shoulder 54 and into the pyrolysis zone 50 when the reactor has been provided with these features. The carbonaceous feedstock can be introduced into the hot combustion gases from the axis of the precombustion zone or radially into the hot combustion gases from the periphery thereof between the precombustion zone and the pyrolysis zone to form the reaction mixture which decomposes to form carbon black. Further downstream in the pyrolysis zone 50, the reaction mixture is quenched by admixture with a suitable quench fluid and collected as is known in the art.

By flowing the first stream of hot combustion gases along the first helical ramp to a position downstream of the inlet for the second stream of hot combustion gases and flowing the second stream of hot combustion gases along the the second helical ramp to a position downstream of the inlet for the first stream of hot combustion gases, pressure drop through the reactor can be greatly reduced.

What is claimed is:

1. A carbon black reactor having a longitudinal axis and comprising
    (a) a precombustion zone defined by a sidewall in said reactor, the sidewall of the precombustion zone being of generally cylindrical shape, said precombustion zone having an upstream end and a downstream end;

(b) a plurality of tunnels each having a tunnel diameter and adapted for conveying combustion gases opening generally tangentially into the precombustion zone through the generally cylindrical sidewall; and (c) a plurality of ramps positioned in the precombustion zone to form its upstream end, each of said ramps being formed from a refractory material having a circumferential side which follows the sidewall of the precombustion zone for a portion of its circumference, a first generally radially extending side defined between an upstream edge and a downstream edge of each of the ramps, a second generally radially extending side defined between the upstream edge and the downstream edge of each ramp and a generally planar ramp face extending between the downstream edge of the first radially extending side and the downstream edge of the second radially extending side and meeting the circumferential side along a generally helically extending portion of the downstream edge of the refractory, the downstream edge of the second generally radially extending side being downstream of the downstream edge of the first generally radially extending side, one of the ramps positioned in the precombustion zone for each of the tunnels with the tunnel opening into the precombustion zone slightly downstream of the helically extending portion of the downstream edge of the ramp.

2. A carbon black reactor as in claim 1 wherein the plurality of ramps are positioned in the precombustion zone in adjacent pairs of ramps, with the first side of the first ramp of the pair positioned facing the second side of the second ramp of the pair.

3. A carbon black reactor as in claim 2 wherein said plurality of tunnels comprises two tunnels and said plurality of ramps comprises two ramps, with the downstream edge of each second surface of each ramp being positioned about downstream of the tunnel which opens into the precombustion zone slightly downstream of the helical edge adjacent the downstream edge of the first surface of the other ramp.

4. A carbon black reactor as in claim 3 further comprising a generally frustoconical acceleration zone connected coaxially to the downstream end of the precombustion zone and converging away from the precombustion zone from an inlet having a diameter about the same as that of the precombustion zone to an outlet having a diameter in the range of 10% to 50% of the diameter of the precombustion zone and a means at the outlet of the acceleration zone for introducing a carbonaceous feedstock radially inward toward the axis of the reactor.

5. A carbon black reactor as in claim 4 further comprising a generally cylindrical reaction zone connected to the outlet having a diameter in the range of 1.1 to about 3 times the diameter of the outlet of the frustoconical zone, said generally cylindrical reaction zone being partially defined at its upstream end by a generally annular end wall.

6. A carbon black reactor as in claim 3 further comprising a generally cylindrical refractory member axially positioned in the precombustion zone between the first ramp and the second ramp, said generally cylindrical refractory member having a diameter in the range of 0.1 to about 0.5 times the diameter of the precombustion zone.

7. A carbon black reactor as in claim 6 wherein the generally cylindrical refractory member extends into the generally cylindrical precombustion zone to a depth upstream of the downstream edge of the second surface of each ramp.

8. A carbon black reactor as in claim 7 further comprising a means extending axially through the generally cylindrical refractory member for introducing a carbonaceous feedstock into the carbon black reactor from the axis thereof.

* * * * *